United States Patent [19]

Mannon et al.

[11] 4,336,786
[45] Jun. 29, 1982

[54] ATTACHMENT MEMBER FOR SECURING THE ENDS OF CABLES IN A COMPOUND BOW

[75] Inventors: Walter L. Mannon; Cary L. Cochran, both of Alum Creek, W. Va.

[73] Assignee: Victor United, Inc., Chicago, Ill.

[21] Appl. No.: 175,891

[22] Filed: Aug. 6, 1980

[51] Int. Cl.³ ............................................... F41B 5/00
[52] U.S. Cl. ............................ 124/23 R; 403/DIG. 4; 24/135 N; 124/86
[58] Field of Search ...................... 124/24 R, 23 R, 90, 124/86; 403/215, 213, 210, 209; 24/115 F, 115 H, 115 K, 135 N

[56] References Cited

U.S. PATENT DOCUMENTS

| | | | |
|---|---|---|---|
| 1,552,640 | 9/1925 | O'Neil | 24/114.5 |
| 2,189,671 | 2/1940 | Mardis | 403/210 |
| 3,486,495 | 12/1969 | Allen | 124/24 R |
| 3,704,488 | 12/1972 | Higgins | 403/209 |
| 3,928,889 | 12/1975 | Wartian | 403/209 X |
| 4,202,316 | 5/1980 | Barna | 124/24 R |

FOREIGN PATENT DOCUMENTS 724841  4/1980  U.S.S.R. ........................... 24/115 K

Primary Examiner—Richard C. Pinkham
Assistant Examiner—William R. Browne
Attorney, Agent, or Firm—Emory L. Groff, Jr.

[57] ABSTRACT

Cable ends of a compound bow are adjustably anchored by an attachment member pivotally mounted adjacent the bow eccentric wheels. The attachment member includes a plurality of openings therethrough which are angularly offset relative to one another to define alternate circuitous cable pathways. A releasable lock device engages the cable end in one of the attachment member openings while a laterally offset section on the attachment member allows alternative 180° reversible mounting thereof.

11 Claims, 5 Drawing Figures

U.S. Patent  Jun. 29, 1982  4,336,786
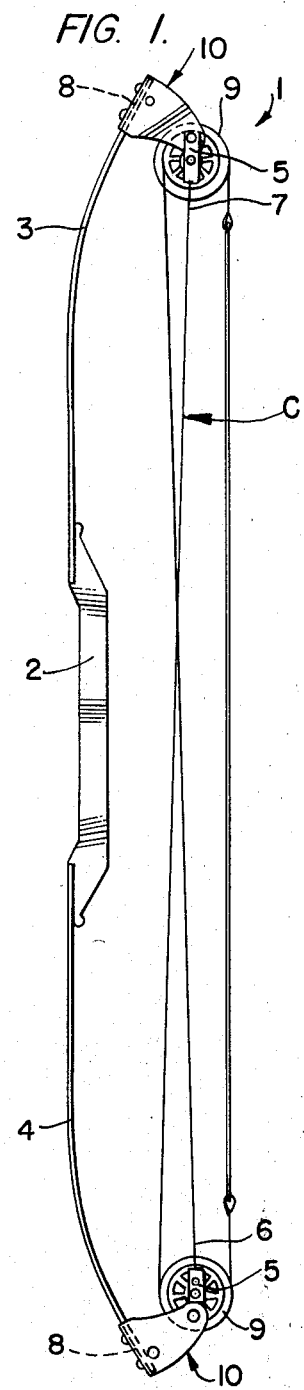
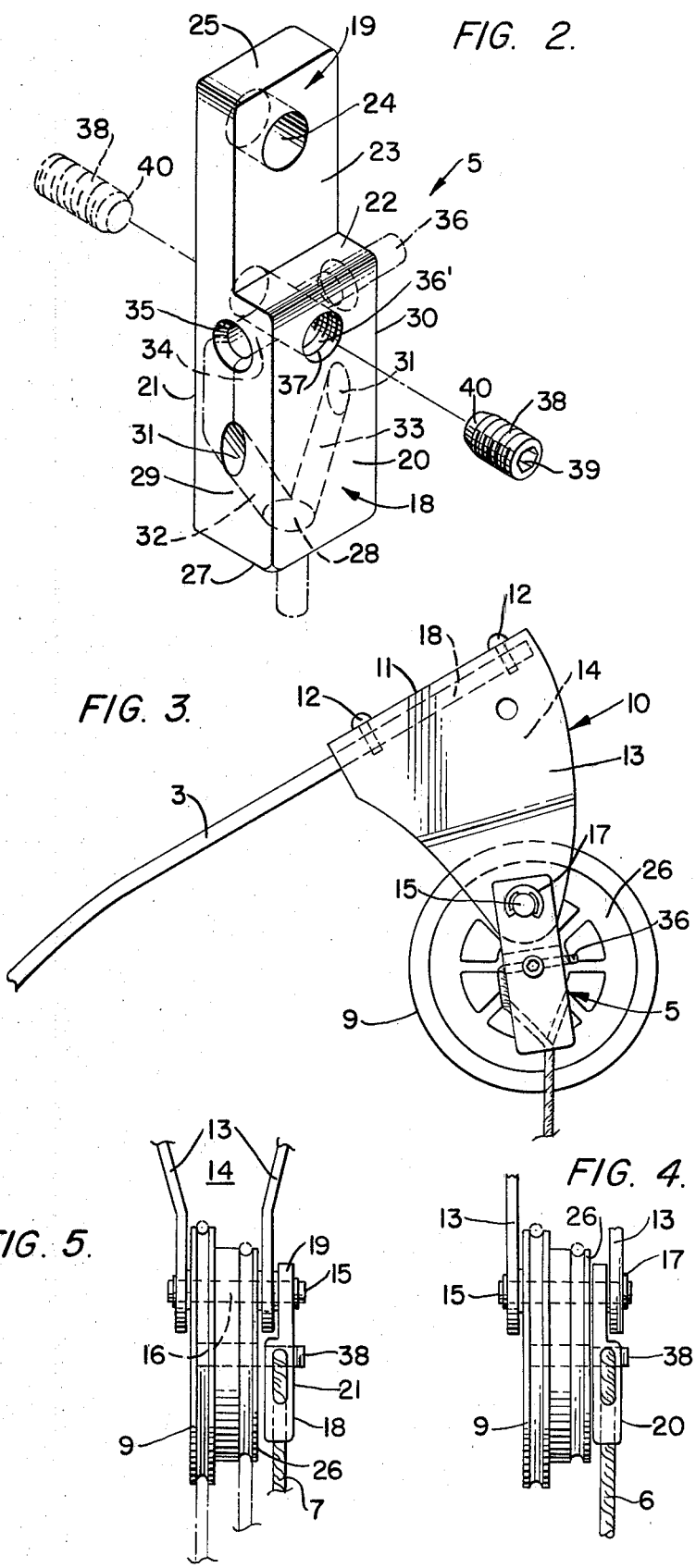
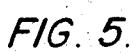

ATTACHMENT MEMBER FOR SECURING THE ENDS OF CABLES IN A COMPOUND BOW

This invention relates generally to archery bows and more particularly to an improved attachment member for securing the ends of cables in a compound bow.

The present invention is especially adapted for use with compound bows wherein the terminal portions of the eccentric or pulley cables are intended to be anchored in the area adjacent the tips of the bow limbs. Such bows may include two, four, or more wheels about which portions of the cable pass and until the present invention, one of the more common methods of securing the free ends of the cable adjacent the bow limb tips has comprised the step of passing the terminal portions of the cable about the eccentric pivot pins and thereafter attaching the distal portion of the cable to the same cable by means of an appropriate crimped fastener. Quite obviously, such an attachment leaves considerable to be desired. In some instances, the crimped fastener has been known to fail and probably more importantly, such a fastener can only be properly applied at the time of manufacture of the bow cable and subsequently leaves no provision for manipulation or adjustment by the user. This latter feature raises quite a disadvantage since it does not provide any means by which an archer may custom string or adjust his compound bow.

As will be appreciated by those familiar with compound bows, the stringing or outfitting of such a bow with its cable and bow string is very critical in order to achieve a proper balance or synchronization of the eccentrically mounted wheels. By the present invention an improved cable end attachment member is provided which may be readily used by an archer even in the field and allows quick attachment and subsequent adjustment of either or both cable ends with a result that an accurate, positive secure anchoring of the cable terminal ends is achieved.

The instant attachment member includes a symmetrical base section attached to a pivot section which is offset or off center with respect to the base section so that the member may be utilized by attaching it to the wheel pivot pin either inside or outside the spaced apart elements of the wheel attachment means or bracket. Additionally, the attachment member base section is provided with a pair of converging cable passageways therethrough which allow the selected positioning of the cable so that the same attachment member may be utilized adjacent both bow limb tips thereby assuring maintenance of a symmetrical disposition of the two cable ends.

Accordingly, one of te objects of the present invention is to provide an improved archery bow cable end attachment member provided with a base section having a circuitous pathway for the cable end together with releaseable lock means engageable with a portion of the cable end passing through the attachment member.

Another object of the present invention is to provide an improved archery bow cable end attachment member having a circuitous pathway therein for the cable end and including an offset pivot section which may be reversed 180° to accommodate alternative wheel limb attachment means associated with various compound bows.

Still another object of the present invention is to provide an improved archery bow cable attachment including an attachment member having an offset pivot section mounted upon a compound bow wheel pivot pin and provided with a base section formed with a pair of converging passageways selectively usable to accommodate the cable end.

Another object of the present invention is to provide an improved archery bow cable attachment member having a base section provided with converging cable passageways cooperating with a longitudinal cable bore having transverse lock receiving means communicating therewith from either side such that a symmetrical base section is provided and allows an alternate disposition of a cable end through either one of the converging passageways and into either end of the longitudinal cable bore.

With these and other objects in view which will more readily appear as the nature of the invention is better understood, the invention consists in the novel construction, combination and arrangement of parts hereinafter more fully described, illustrated and claimed.

FIG. 1 is a side elevation of a typical compound bow incorporating the cable end attachment of the present invention;

FIG. 2 is an enlarged perspective view of the cable end attachment member;

FIG. 3 is a partial side elevation of the cable end attachment member mounted outside an eccentric wheel bracket;

FIG. 4 is a fragmentary rear elevation illustrating the attachment member mounted inside the wheel mounting bracket; and FIG. 5 is a view similar to FIG. 4 and illustrates the alternative mounting of the cable end attachment member outside the wheel bracket as in FIG. 3.

Similar reference characters designate corresponding parts throughout the several figures of the drawing.

Referring now to the drawing, particularly FIG. 1, the present invention will be understood especially to relate to a compound bow, generally designated 1, having a central handle 2 and a pair of limbs 3-4 extending therefrom. It will be appreciated that the cable attachment system proposed by this invention may be practiced in combination with numerous types of archery bows and therefore the illustrated bow 1 is merely exemplary since the essence of the invention resides in the unique cable end attachment member 5 which is used to adjustably secure both the first cable end 6 and second cable end 7 with respect to the two adjacent bow limb tips 8—8.

Regardless of the number of wheels or pulleys found in any single compound bow there will usually always be at least a pair of pulleys appropriately mounted adjacent the two bow limb tips 8 such as shown in FIGS. 1 and 3 of the drawing. Thus, these figures illustrate the very basic concept of a compound bow by disclosing a wheel or pulley 9 eccentrically mounted adjacent the two bow limb tips 8 by means of wheel limb attachment means such as the illustrated bracket 10. This type of bracket includes a base 11 overlying and suitably affixed to the limb tip 8 by appropriate fasteners 12. Depending from the base 11 are a pair of side arms or elements 13—13 defining a wheel receiving opening 14 therebetween.

The wheel 9 is mounted for rotation between the side elements 13—13 by means of a pivot pin or shaft 15 disposed through the eccentrically located pivot bore 16 and supported in holes within the two elements 13. Any suitable pivot pin retainer means may be utilized such as the external snap rings 17. It will be understood that although brackets 10 are shown in the drawing for the purpose of supporting the wheels, quite obviously alternative wheel limb attachment means may be utilized as is well known in the art. For example, many bows use a split limb attachment for the compound bow eccentric wheels wherein a central groove is provided through both limb tips with the wheels disposed therein and suitably supported by the same type of pivot pin appropriately supported by these spaced apart limb tip sections and spanning the groove therebetween.

The two ends 6 and 7 of the cable C are conveniently secured adjacent each wheel 9 by the use of one of the cable end attachment members 5 which will be seen to be journaled about the same wheel pivot pin 15. The attachment member comprises an inner, cable receiving base section 18 and an integral outer, offset pivot section 19. The base section 18 includes a first side wall 20 and an opposite parallel second side wall of the pivot section 19. As shown most clearly in FIG. 2 of the drawing, the base section side wall 20 terminates at a point communicating with the horizontal shoulder 22 which shoulder is normal to the inside face 23 of the pivot section 19. This vertical inside face 23 is disposed substantially mid-way between the first and second side walls 20-21 of the base section 18 while the distal portion of the pivot section will be seen to be provided with a transverse pivot bore 24 located adjacent the end wall.

The mounting of the attachment member 5 as described to this point will be readily understood when considering the alternative arrangements as shown in FIGS. 4 and 5 of the drawing. In the embodiment of FIG. 4, the attachment member 5 is shown as it would appear when mounted inside or between the side elements 13 of the bracket 10 and wherein the second side wall 21 of the attachment member is juxtaposed the side 26 of the wheel 9 and is similar to the installation such as shown in the lower portion of FIG. 1 wherein the first cable end 6 is secured thereby. In the other arrangement illustrated in FIG. 5, the cable end attachment member 5 is reversed 180° so that the base section first side wall 20 is juxtaposed the side 26 of the wheel and the pivot section 19 of the attachment member is disposed upon the pivot pin 15 at a point outboard of the intermediate bracket side arm 13. This view illustrates the arrangement as shown in the upper portion of FIG. 1 and serves to secure the second cable end 7. In passing, it should be noted that usually both brackets or other wheel limb attachment means on any one bow will be similar and not mixed as in FIG. 1 wherein the upper bracket side arms 13 are spaced apart as in FIG. 5 while the lower bracket arms are as shown in FIG. 4. For simplicity sake, these two alternatives have been shown in the single bow of FIG. 1.

With the manner of mounting the attachment member 5 to the bow structure per se having been described, the details of the attachment member construction for receiving and securing either of the two cable ends 6 and 7 may now be explained with particular reference being made to FIGS. 2 and 3 of the drawing. The base section end wall 27 is provided with a centrally disposed cable access opening 28 while each of the adjacent transverse walls 29 and 30 are provided with symmetrically disposed exit openings 31. A first cable passageway 32 joins the exit opening 31 in the transverse wall 29 to the access opening 28 while a second cable passageway 33 joins the exit opening 31 in the transverse wall 30 with the cable access opening 28 such that a pair of converging, symmetrically disposed passageways are formed within the central portion of the base section 18. Spaced between the two exit openings 31 and the shoulder 22 is a longitudinally extending cable bore 34 having its center axis vertically aligned along a plane passing through the center axis of the cable passageways 32-33 and which will be seen from FIG. 2 to be provided with a chamfer 35 at its juncture with each of the two transverse walls 29-30.

The above described structure of the attachment member base section 18 will be understood to provide a pair of alternate cable pathways capable of being selected by the archer depending upon the specific location and manner of mounting of the attachment member to the bow. The first cable end 6 is shown in FIG. 2 of the drawing as it is inserted and secured in the example shown in the lower portion of FIG. 1 and in FIG. 4 wherein it will be seen that the cable is attached by initially inserting its distal portion 36 through the cable access opening 28 and thence through the first cable passageway 32 until the free end 36 emerges from the exit opening 31 on the transverse wall 29. Thereafter, the end of the cable defines an obtuse angle as it is passed upwardly juxtaposed the transverse wall 29 prior to being inserted through the longitudinal cable bore 34 untis its terminal portion 36 emerges from the opposite end of the cable bore 34. Depending upon the specific composition of the material comprising the cable C it will be apparent that a certain degree of anchoring of the cable within the attachment member 5 will be inherent in view of the above described circuitous pathway defined by the thus installed cable end 6 but quite obviously additional, more positive means must be included to insure a thorough anchoring of the cable ends.

Accordingly, a lock receiving opening 36' is disposed transversely through the base section 18 in a horizontal plane coincident with that of the longitudinal cable bore 34 and this opening 36' will be understood to extend through both the first side wall 20 as well as the second side wall 21 for reasons which will become obvious hereinafter. The lock receiving opening 36' is provided with internal threads 37 adapted to cooperate with an appropriate lock means 38 such as the illustrated set screw. An appropriate tool receiving opening 39 is preferably provided in the face of the set screw 38 such as the illustrated hexagonal socket for receiving a hexagonal wrench so that following insertion of a cable end as above described, the set screw 38 inserted within the opening 36' is tightened until its nose 40 engages and firmly locks the cable end portion disposed within the longitudinal cable bore 34.

An alternate pathway for the cable end is followed when the attachment member 5 is reversed as shown in FIG. 5 or in the case of the attachment member used at the opposite end of the bow. This alternate pathway will be described with reference again to FIG. 2. After initially inserting the distal portion 36 of the cable end through the cable access opening 28, the cable end is guided through the second cable passageway 33 and after emerging through the exit opening 31 in the transverse wall 30 the cable is bent at an obtuse angle prior to insertion into the longitudinal cable bore 34 through its opening in the transverse wall 30. In other words, the pathway of the cable in this second instance describes a route which is a mirror image of the route shown by the cable in FIG. 2 of the drawing and the thus installed cable end is subsequently firmly anchored in the same manner by means of the set screw 38.

When the cable end attachment member 5 is installed with its second side wall 21 exposed to the outside such as shown in the upper portion of FIG. 1 and in FIG. 5, the final anchoring of the cable end therein is achieved by inserting the same set screw 38 into the lock receiving opening 36' from the second side wall 21 instead of the first side wall 20 as previously described since the first side wall 20 is inaccessible due to its juxtaposition with the side 26 of the wheel. Accordingly, it will be appreciated that the same single lock receiving opening 36' which bisects the longitudinal cable bore 34 is used in alternate ways to provide the final locking of the cable end depending upon the manner in which the end attachment member 5 is installed with respect to its adjacent wheel 9.

From the foregoing it will be seen that an improved manner of attaching archery bow cables has been presented and which provides a positive anchoring of the cable by means of both a circuitous pathway as well as releasable lock means. Not only is it possible to readily maintain the proper relative tension on the two cable ends in a compound bow by manipulation of the lock means and shifting of the cable ends but also, flexibility is achieved by providing a cable attachment member capable of 180° reversible mounting upon a bow and offering alternative circuitous cable pathways.

We claim:

1. A compound archery bow having wheels eccentrically mounted upon pivot pins disposed adjacent the bow limb tips, a cable passing around said wheels and having free ends attached adjacent said wheels, a cable end attachment member mounted upon at least one said pivot pin, said attachment member including, a base section having a cable passageway therethrough for longitudinally adjustably receiving one said cable end therein, said base section including a plurality of walls and said cable passageway and a portion of said cable end extend through two said walls, said base section provided with a cable bore extending through two of said walls and receiving another portion of said cable end following said portion within said passageway, lock means selectively engageable with said cable end within said base section, a pivot section joined to said base section and having means adapted to receive said pivot pin whereby, a circuitous cable end pathway is defined by said attachment member.

2. A compound archery bow according to claim 1 wherein, said base section includes a second cable passageway therethrough angularly disposed relative said other cable passageway whereby, alternate pathways are provided for receiving said cable end.

3. A compound archery bow according to claim 2 wherein, said base section includes an end wall provided with a cable access opening and both said cable passageways converge at said access opening.

4. A compound archery bow according to claim 1 wherein, said base section includes a first side wall and an opposite parallel second side wall, said pivot section provided with a side wall extending from and substantially coplanar with said second side wall, said pivot section including an inside face opposite and parallel said pivot section side wall and inwardly offset from said base section first side wall to provide a shoulder therebetween and a pivot section having a substantially lesser thickness than that of said base section whereby, said attachment member may be rotated 180° before mounting on said pivot pin to alternately position either said base section first or second side wall juxtaposed said wheel.

5. A compound archery bow according to claim 1 wherein, said cable bore and cable passageway are non-axially aligned and said locking means engageable with said cable end within said cable bore.

6. An archery bow cable end attachment member including, a base section having a cable passageway therethrough for longitudinally adjustable receiving a cable end therein, said base section including a plurality of walls and said cable passageway and a portion of said cable end extend through two said walls, said base section provided with a cable bore extending through two of said walls and receiving another portion of said cable end following said portion within said passageway, lock means selectively engageable with said cable end within said base section, said base section including a second cable passageway therethrough angularly disposed relative said first mentioned cable passageway whereby alternate pathways are provided for receiving said cable end, said base section having an end wall provided with a cable access opening and both said cable passageways converge at said access opening, and a pivot section joined to said base section and having means adapted to receive a pivot pin for supporting said attachment member upon an archery bow whereby, a circuitous cable end pathway is defined by said attachment member.

7. An archery bow cable end attachment member according to claim 6 wherein, said lock means includes a threaded bore transversely disposed in said base section and intersecting said cable bore.

8. An archery bow cable end attachment member according to claim 7 including, a set screw insertable within said threaded bore.

9. An archery bow cable end attachment member according to claim 8 wherein, said threaded bore extends through two sides of said base section whereby, said set screw may be inserted into said threaded bore from either end thereof to engage said cable end disposed in said cable bore.

10. An archery bow cable end attachment member according to claim 6 wherein, said cable bore and cable passageway are non-axially aligned and said lock means engageable with said cable end within said cable bore.

11. An archery bow cable end attachment member including, a base section having a cable passageway therethrough for longitudinally adjustably receiving a cable end therein, said base section including a plurality of walls and said cable passageway and a portion of said cable end extend through two said walls, said base section provided with a cable bore extending through two of said walls and receiving another portion of said cable end following said portion within said passageway, lock means selectively engageable with said cable end within said base section, a pivot section joined to said base section and having means adapted to receive a pivot pin for supporting said attachment member upon an archery bow, said base section including a first side wall and and opposite parallel second side wall, said pivot section provided with a side wall extending from and substantially co-planar with said second side wall, said pivot section including an inside face opposite and parallel said pivot section side wall and inwardly offset from said base section first side wall to provide a shoulder therebetween with said pivot section having a substantially lesser thickness than that of said base section whereby said attachment member may be rotated 180° before mounting on said pivot pin to alternately position said offset inside face in opposite directions relative thereto, whereby a circuitous cable end pathway is defined by said attachment member.

* * * * *